Figures 1, 2:
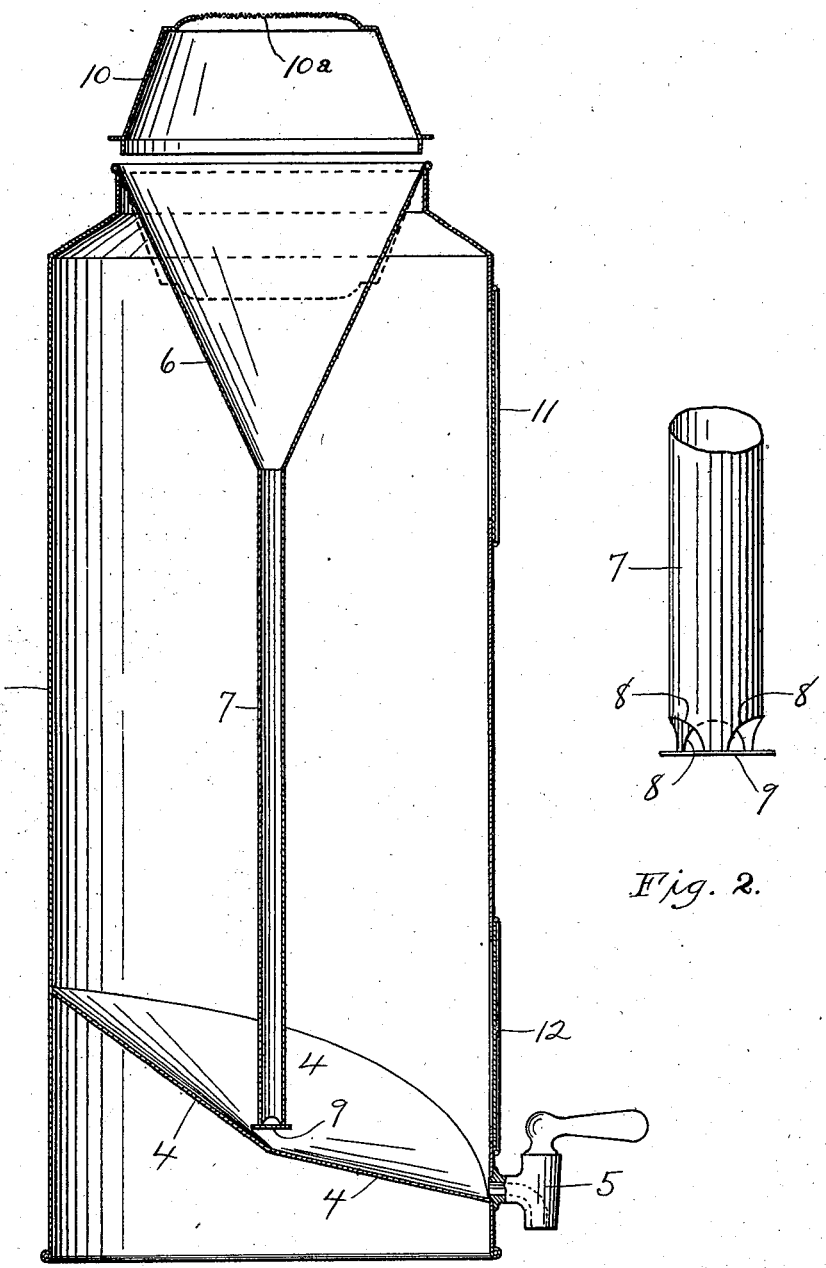

No. 727,781. PATENTED MAY 12, 1903.
H. GALER.
CREAM SEPARATOR.
APPLICATION FILED DEC. 31, 1900.
NO MODEL.

WITNESSES:
K. M. Imboden,
M. L. Lange.

INVENTOR,
Herbert Galer.
By Higdon & Higdon,
ATT'YS.

THE NORRIS PETERS CO., PHOTO-LITHO., WASHINGTON, D. C.

No. 727,781. Patented May 12, 1903.

UNITED STATES PATENT OFFICE.

HERBERT GALER, OF KANSAS CITY, KANSAS.

CREAM-SEPARATOR.

SPECIFICATION forming part of Letters Patent No. 727,781, dated May 12, 1903.

Application filed December 31, 1900. Serial No. 41,756. (No model.)

*To all whom it may concern:*

Be it known that I, HERBERT GALER, a citizen of the United States, and a resident of Kansas City, in the county of Wyandotte and State of Kansas, have invented new and useful Improvements in Cream-Separators, of which the following is a specification.

My invention relates to that class of cream-separators in which the separation of the cream from the milk is effected by mixing cold water with the lower portion of the milk; and the objects of my invention are to produce a separator-can which may be easily cleaned and to enable the line between the milk and cream to be observed at the lowest portion of the can—that is, adjacent to the faucet. I attain these objects by the construction shown in the accompanying drawings, in which—

Figure 1 is a central vertical view of a separator constructed in accordance with my invention, showing the combined strainer and cover above the can. Fig. 2 is an enlarged detail view of the lower end of the water-tube, showing the openings therein.

The cylindrical can 3 is provided with an imperforate circular bottom plate 4, which is trough-like and inclined downwardly toward the faucet 5, as shown. Its bottom is formed with an obtuse angle occurring in the trough at the diametric center of the can.

The removable funnel 6 is supported by the top of the can 3 when in use. To the lower end of the funnel 6 is secured a depending tube 7, provided with three or more semicircular openings 8 in its lower end. Across the points between these openings is secured a circular plate 9 larger than the diameter of the tube for directing the water laterally into the milk. The lower end of the tube 7 stands over the angle at the center of the bottom 4, whereby the inflowing liquid will be dissipated on nearly all sides of said tube.

The combined strainer and cover 10 is adapted to fit the mouth of the can 3 when the funnel 6 is removed. The position of this cover when used as a strainer is indicated by dotted lines in Fig. 1.

Two sight-panes 11 12 are secured to the can 3, each being provided with the usual gage-plate. The object of the pane 11 is to show the thickness of cream above the milk. The object of the lower pane 12 is to indicate when the cream-line reaches the faucet.

The operation of the separator is as follows: The strainer 10 is placed in the mouth of the can, and through it is poured approximately half a can of "full milk"—*i. e.*, milk from which the cream has not yet been separated. The strainer is then removed and the funnel inserted, as shown in the drawings, and the proper amount of cold water is poured into the funnel. Issuing from the lower end of the tube, this water is dissipated by the plate 9, and the fact that all sides of the bottom 4 except one are lower than the openings 8 permits water to enter gently beneath the full milk and raise the same within the can without mixing the water and milk. The whole is allowed to stand for from thirty to sixty minutes, so that the cream will rise to the top. The skim-milk will stand next below and the water at the bottom, all separated by distinct lines of division. The faucet is then manipulated to draw off first the water, then the skim-milk into one receptacle, and finally the cream into a separate receptacle, and the sight-panes 11 and 12 at all times permit inspection of the liquid, so as to assist the operator.

Having now fully described my invention, what I claim as new, and desire to secure by Letters Patent of the United States, is—

In a cream-separator, a cylindrical upright can having an imperforate trough-like bottom secured therein with its peripheral edge and its trough both descending from one side of the can to the other and its trough of obtuse angular section, and a faucet opening through the can at the lowest point of said bottom; combined with a removable funnel adapted to be supported by the mouth of the can, and a tube depending from the funnel with its lower end adapted to stand over the center of said bottom lower than the highest point in its edge and higher than its lowest, the whole constructed as and for the purpose set forth.

In testimony whereof I affix my signature in the presence of two witnesses.

HERBERT GALER.

Witnesses:
M. L. LANGE,
K. M. IMBODEN.